US009558073B2

(12) United States Patent
Cantwell et al.

(10) Patent No.: US 9,558,073 B2
(45) Date of Patent: *Jan. 31, 2017

(54) INCREMENTAL BLOCK LEVEL BACKUP

(71) Applicant: NETAPP, INC., Sunnyvale, CA (US)

(72) Inventors: Jared Cantwell, Boulder, CO (US); Matt Holiday, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,966

(22) Filed: Apr. 13, 2015

(65) Prior Publication Data

US 2015/0220402 A1   Aug. 6, 2015

Related U.S. Application Data

(63) Continuation of application No. 14/057,145, filed on Oct. 18, 2013, now Pat. No. 9,372,757.

(51) Int. Cl.
*G06F 17/30* (2006.01)
*G06F 11/14* (2006.01)

(52) U.S. Cl.
CPC ........ *G06F 11/1451* (2013.01); *G06F 17/301* (2013.01); *G06F 17/30368* (2013.01); *G06F 17/30961* (2013.01); *G06F 2201/80* (2013.01)

(58) Field of Classification Search
None
See application file for complete search history.

(56) References Cited

U.S. PATENT DOCUMENTS

| 6,604,155 | B1 | 8/2003 | Chong, Jr. |
| 6,912,645 | B2 * | 6/2005 | Dorward et al. ............. 711/216 |
| 7,093,086 | B1 * | 8/2006 | van Rietschote ............. 711/161 |
| 7,797,279 | B1 * | 9/2010 | Starling .............. G06F 11/1451 707/641 |
| 8,224,935 | B1 | 7/2012 | Bandopadhyay et al. |
| 2003/0028642 | A1 | 2/2003 | Agarwal et al. |

(Continued)

OTHER PUBLICATIONS

International Search Report and Written Opinion of the International Search Authority received for Application No. PCT/US2014/060031 mailed Jan. 26, 2015, 9 pages.

(Continued)

*Primary Examiner* — James Trujillo
*Assistant Examiner* — Aida Tessema
(74) *Attorney, Agent, or Firm* — Foley & Lardner LLP

(57) ABSTRACT

Disclosed are systems, computer-readable mediums, and methods for incremental block level backup. An initial backup of a volume is created at a backup server, where creating the initial backup includes retrieving an original metadata file from a metadata server, and retrieving a copy of all data of the volume based on the original metadata file. A first incremental backup of the volume is then created at the backup server, where creating the first incremental backup includes retrieving a first metadata file, where the first metadata file was created separately from the original metadata file. A block identifier of the first metadata file is compared to a corresponding block identifier of the original metadata file to determine a difference between the first and original block identifiers, and a copy of a changed data block of the volume is retrieved based on the comparison of the first and original block identifiers.

17 Claims, 4 Drawing Sheets

(56) References Cited

U.S. PATENT DOCUMENTS

| | | |
|---|---|---|
| 2004/0107281 A1 | 6/2004 | Bose et al. |
| 2004/0133622 A1 | 7/2004 | Clubb et al. |
| 2005/0091261 A1 | 4/2005 | Wu et al. |
| 2005/0246398 A1* | 11/2005 | Barzilai ............... G06F 11/1448 |
| 2007/0083722 A1* | 4/2007 | Per et al. ....................... 711/162 |
| 2007/0208918 A1 | 9/2007 | Harbin et al. |
| 2010/0293147 A1 | 11/2010 | Snow et al. |
| 2011/0238857 A1 | 9/2011 | Certain et al. |
| 2012/0124282 A1 | 5/2012 | Frank et al. |
| 2012/0197844 A1* | 8/2012 | Wang et al. ................... 707/646 |
| 2012/0310890 A1* | 12/2012 | Dodd ................... G06F 11/1451 707/646 |
| 2012/0317353 A1 | 12/2012 | Webman et al. |
| 2012/0317395 A1 | 12/2012 | Segev et al. |
| 2013/0110783 A1* | 5/2013 | Wertheimer et al. ......... 707/646 |
| 2013/0124776 A1 | 5/2013 | Hallak et al. |
| 2013/0173955 A1 | 7/2013 | Hallak et al. |
| 2013/0305002 A1 | 11/2013 | Hallak et al. |

OTHER PUBLICATIONS

Non-Final Office Action received in U.S. Appl. No. 14/057,145 mailed Jun. 30, 2015, 22 pages.
Notice of Allowance received for U.S. Appl. No. 14/057,145 mailed Feb. 22, 2016, 14 pages.

* cited by examiner

INCREMENTAL BLOCK LEVEL BACKUP

CROSS-REFERENCE TO RELATED APPLICATIONS

The present application is a continuation of U.S. patent application Ser. No. 14/057,145, filed Oct. 18, 2013, the entire contents of which are incorporated herein by reference in its entirety.

BACKGROUND

The following description is provided to assist the understanding of the reader. None of the information provided is admitted to be prior art.

In data storage architectures, a client's data may be stored in a volume. A unit of data, for example a file (or object), is comprised of one or more storage units (e.g. bytes) and can be stored and retrieved from a storage medium such as disk or RAM in a variety of fashions. For example, disk drives in storage systems are divided into logical blocks that are addressed using logical block addresses (LBAs). As another example, an entire file can be stored in a contiguous range of addresses on the storage medium and be accessed given the offset and length of the file. Most modern file systems store files by dividing them into blocks or extents of a fixed size, storing each block in a contiguous section of the storage medium, and then maintaining a list or tree of the blocks that correspond to each file. Some storage systems, such as write-anywhere file layout (WAFL), logical volume manager (LVM), or new technology file system (NTFS), allow multiple objects to refer to the same blocks, typically through a tree structure, to allow for efficient storage of previous versions or "snapshots" of the file system. In some cases, data for a single file or object may be distributed between multiple storage devices, either by a mechanism like RAID which combines several smaller storage media into one larger virtual device, or through a distributed storage system such as Lustre, General Parallel File System, or GlusterFS.

At some point, it is desirable to backup data of the storage system. Traditional backup methods typically utilize backup software that operates independently of the data storage system and manages the backup process. Backup methods exist to backup only the differences since the last full backup (e.g., a differential backup) or to backup only the changes since the last backup (e.g., an incremental backup). However, due to inefficiency of backup software, many administrators are shifting away from traditional backup processes and moving towards data replication methods. Though, replication requires the use of a second data storage system for replication purposes, which can be costly. Also, with replication comes the issue of replicating a mistake, for example, a wrongly deleted file. High bandwidth is required for both replication and backup solutions, and neither methods are particularly well suited to scale efficiently for long term archiving.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

Figure 1:
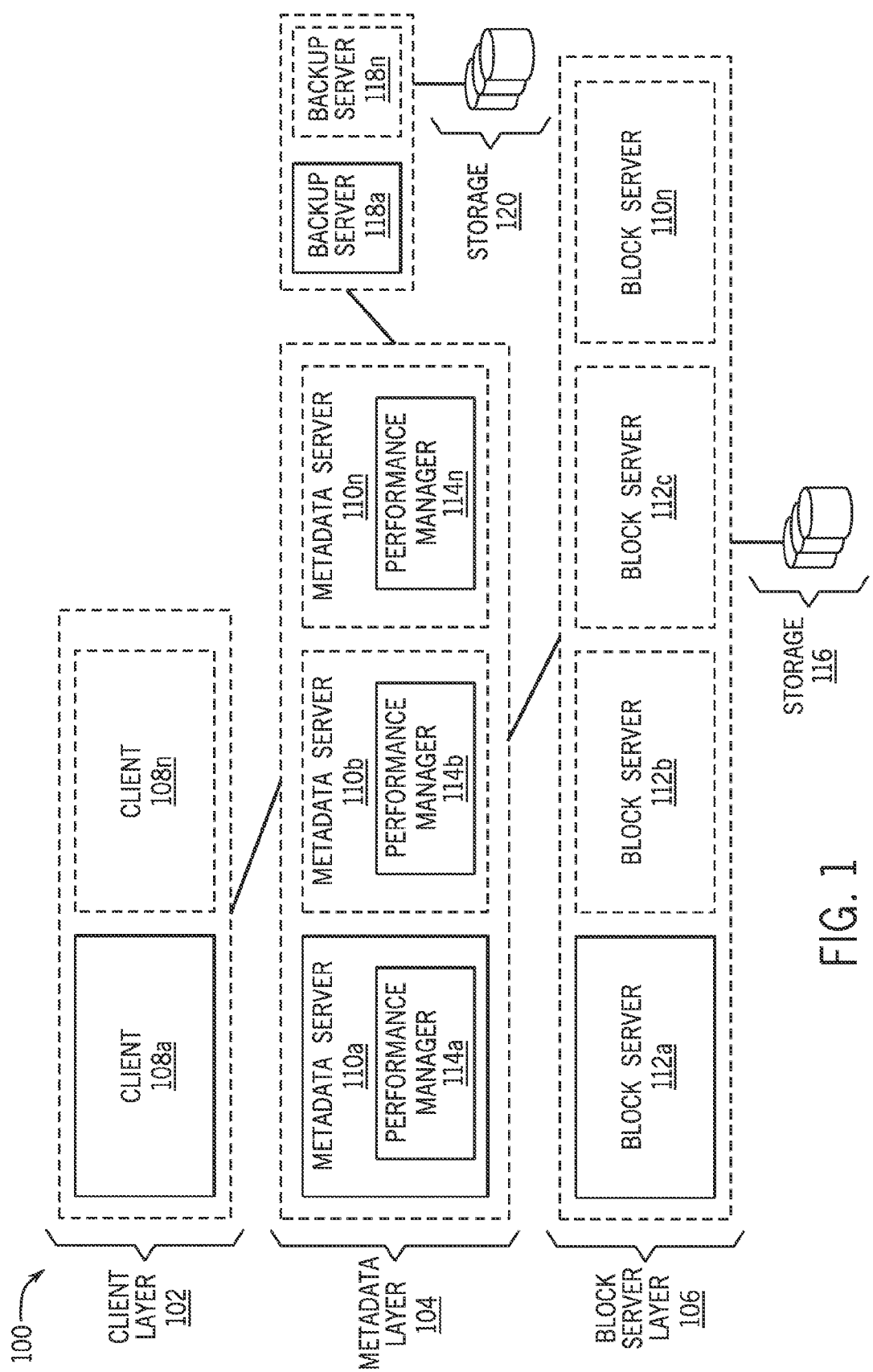
FIG. 1 depicts a simplified system for a storage system in accordance with an illustrative implementation.

In general, one aspect of the subject matter described in this specification can be embodied in a system that includes a backup server comprising one or more processors configured to create an initial backup of a volume and create a first incremental backup of the volume. Creating the initial backup includes retrieving an original metadata file from a metadata server, where the metadata file comprises an ordered list of block identifiers for data blocks of the volume, where each block identifier is used to access a data block stored on a block server, and where the block identifier is a hash based on content of a corresponding data block. Creating the initial backup further includes retrieving a copy of all data of the volume based on the original metadata file. Creating the first incremental backup of the volume includes retrieving a first metadata file, where the first metadata file was created separately from the original metadata file. Creating the first incremental backup further includes comparing a block identifier of the first metadata file to a corresponding block identifier of the original metadata file to determine a difference between the first and original block identifiers, where the difference indicates that a data block corresponding to the first block identifier has changed, and retrieving the changed data block based on the comparison of the first and original block identifiers.

Another aspect of the subject matter described in this specification can be embodied in methods for creating an initial backup of a volume at a backup server and creating a first incremental backup of the volume at the backup server. Creating the initial backup includes retrieving an original metadata file from a metadata server, where the metadata file comprises an ordered list of block identifiers for data blocks of the volume, where each block identifier is used to access a data block stored on a block server, and where the block identifier is a hash based on content of a corresponding data block. A copy of all data of the volume is retrieved based on the original metadata file. Creating the first incremental backup of the volume at the backup server includes retrieving a first metadata file, wherein the first metadata file was created separately from the original metadata file, comparing a block identifier of the first metadata file to a corresponding block identifier of the original metadata file to determine a difference between the first and original block identifiers, where the difference indicates that a data block corresponding to the first block identifier has changed, and retrieving the changed data block based on the comparison of the first and original block identifiers. In alternative embodiment, the method further includes creating a second incremental backup including retrieving a second metadata file, where the second metadata file was created separately from the first metadata file. A block identifier of the second metadata file is compared to a corresponding block identifier of the first metadata file to determine a difference between the second and first block identifiers, where the difference between the second and first block identifiers indicates that a data block corresponding to the second block identifier has changed. The changed data block corresponding to the second block identifier is retrieved based on the comparison of the second and first block identifiers. Other implementations of this aspect include corresponding systems, apparatuses, and computer-readable media configured to perform the actions of the method.

Another aspect of the subject matter described in this specification can be embodied in a non-transitory computer-readable medium having instructions stored thereon, that when executed by a computing device cause the computing device to perform operations including creating an initial backup of a volume at a backup server and creating a first incremental backup of the volume at the backup server. Creating the initial backup includes retrieving an original metadata file from a metadata server, where the metadata file comprises an ordered list of block identifiers for data blocks of the volume, where each block identifier is used to access a data block stored on a block server, and where the block identifier is a hash based on content of a corresponding data block. A copy of all data of the volume is retrieved based on the original metadata file. Creating the first incremental backup of the volume at the backup server includes retrieving a first metadata file, wherein the first metadata file was created separately from the original metadata file, comparing a block identifier of the first metadata file to a corresponding block identifier of the original metadata file to determine a difference between the first and original block identifiers, where the difference indicates that a data block corresponding to the first block identifier has changed, and retrieving the changed data block based on the comparison of the first and original block identifiers.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for an incremental block level backup system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1 depicts a simplified system for incremental block level backup of a storage system 100 in accordance with an illustrative implementation. System 100 includes a client layer 102, a metadata layer 104, a block server layer 106, storage 116, and storage 120.

In general, client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers 124 maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 or backup servers 118 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Block Level Incremental Backup

One or more backup servers 118a-118n can interface with the metadata layer 104. Backup servers 118 can interface directly with block servers 112. Backup servers 118a-118n are coupled to storage 120, which stores backups of volume data for clients 108. Storage 120 can include multiple hard disk drives (HDDs), solid state drives (SSDs), hybrid drives, or other storage drives. In one implementation, storage 120 can be a cluster of individual drives coupled together via a network. Backup servers 118 can store backup copies of the data blocks of storage 116 according to any number of formats in storage 120, and translation from the format of the data blocks of storage 116 may occur. Data may be transferred to and from backup servers 118 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol. Compression and data de-duplication may occur in backup servers 118a-118n.

As discussed above, the servers of metadata layer 104 store and maintain metadata that maps between client layer 102 and block server layer 106, where the metadata maps between the client addressing used by clients 108 (e.g., file names, volume, object names, block numbers, etc.) and block layer addressing (e.g., block identifiers) used in block server layer 106. In one embodiment, the metadata includes a list of block identifiers that identifies blocks in a volume. The list may be structured as an ordered list corresponding to a list of blocks. The list may also be structured as the leaves of a hash tree. The block identifiers of the metadata are the same block identifiers as used throughout system 100 as described above. The block identifiers may be hexadecimal numbers, but other representations may be used. Additional metadata may also be included, such as inode numbers, directory pointers, modification dates, file size, client addresses, list details, etc. The block identifiers uniquely identify the data of a block and are a hash based on the content of the data block. Backup servers 118 are generally configured to create backups of block level data of a volume that is stored in storage 116 of block server layer 106. Backup servers 118 may create backups of all of the volume data of block server layer 106 or backup servers 118 may create backups of one or more particular volumes (e.g., a volume of a client 108). Backups may be full backups of all data, or they may be incremental backups (e.g., data that has changed since a previous backup).

During an initial backup operation, a backup server 118 retrieves a copy of metadata from metadata server 110 for a client volume. The metadata includes a list of block identifiers associated with data blocks of the volume. In an implementation, the metadata includes an ordered list structure of block identifiers. In another implementation, the ordered list is structured as the leaves of a hash tree (e.g., a Merkle tree, etc.) and the metadata includes the hash tree. The metadata is used by backup server 118 to retrieve a copy of all of the data blocks of the client volume in order to create an initial backup of the data blocks. The data blocks are retrieved from storage 116 by sending a request for the data to a metadata server 110. The requested data is based on the data block identifiers. A request may include a list of the block identifiers of blocks desired to be backed up. In one implementation, backup server 118 may calculate the LBAs of blocks desired to be backed up. For example, because each block identifier can represent a known amount of data (e.g., a 4 k block, etc.), an LBA of a block can be calculated based on the location of the block identifier in the ordered list of block identifiers associated with the volume. For example, the position of a block identifier in the ordered list can be used along with the block size to determine the LBA of the data block. As described below, the tree structure can also be used to determine the data blocks that have changed after a previous backup. In this example, the number of leaf nodes to the left of a changed leaf node can be used to calculate the LBA of the data block. In implementations where LBAs are calculated, a request from backup server 118 may include a list of LBAs of blocks to be backed up. The metadata server 110 routes the request to a block server 112, which provides the requested data to metadata server 110. Metadata server 110 then routes the requested data to the backup server 118. This arrangement allows the servers of metadata layer 104 to facilitate data transmission between block server layer 106 and the backup servers 118. In another implementation, backup servers 118 may be configured to communicate directly with servers of block server layer 106. Upon retrieval of the requested data, the backup server 118 stores the data in storage 120. The data may be stored in storage 120 according to any of the methods discussed herein. Backup server 118 may create and maintain statistics and snapshot data corresponding to a particular backup operation. The snapshot data may be used later during a data restoration operation, or during a future backup operation. Backup server 118 can also store a copy of the metadata used during a particular backup operation. In another embodiment, the metadata is not stored on the backup server 118. Rather, the metadata is stored on another storage device, for example, one or more metadata servers, one or more block servers, or one or more devices remote from the backup system. As a result of the initial backup operation, a complete backup of the data of a client volume is created and stored in storage 120.

During an incremental backup operation, a backup server 118 retrieves the current metadata from metadata server 110 for a client volume. The backup server 118 can then compare the current metadata from metadata server 110 with a version of stored metadata on backup server 118 (e.g., the version of metadata stored during the most recent backup operation, or the initial version of the metadata stored during the initial backup, etc.). In an implementation where the metadata includes an ordered list of block identifiers, the backup server 118 can compare the block identifiers of the two versions of metadata node-by-node. For example, the current list node corresponding to a first block of data is compared to the stored list node corresponding to the first block of data, and each node of the ordered list is traversed and compared. Since the block identifiers are hashes based on content of a corresponding data block, a difference in hash values for corresponding nodes indicates that the data of the block has been changed/updated since the prior backup. As the block identifiers are integral to storage system 100 and maintained as described herein, the block identifiers can be compared in their native format and immediately used without the need to compute the hash values. In an implementation where the metadata includes a hash tree and the ordered list of block identifiers are structured as the leaves of the hash tree, additional performance gains may be realized. Such a hash tree is generally a tree data structure in which every non-leaf node includes the hash of its children nodes. This structure is particularly useful because it allows efficient determination of which data blocks have been updated since a prior backup, without the need to compare every node of the list of block identifiers. The determination of changed data blocks by using a hash tree will be discussed in further detail below with reference to FIGS. 2a-b. Upon determination of which particular blocks of data have changed since the previous backup, backup server 118 can retrieve the updated blocks of data from storage 116 by sending a request for the changed data block to the metadata server 110. As discussed above, the metadata server 110 can facilitate the transfer of data from the block server layer 106. Upon retrieval of the requested changed data blocks, the backup server 118 stores the data in storage 120. The backup server 118 also stores the current metadata from metadata server 110 used in the incremental backup operation. As a result of the incremental backup operation, only the data of a volume that has changed since a previous backup operation is backed up again. This provides a number of advantages, including increasing the efficiency of the data backup procedure, and decreasing the overall amount of data being transferred during the backup procedure. Further, any number of incremental backup operations may be performed, during which the current metadata from metadata server 110 may be compared to previously stored metadata on backup server 118 (e.g., the stored metadata from a prior backup operation).

Backup servers 118 may also provide an application programming interface (API) in order to allow clients 108 or traditional data backup software to interface with the backup systems described herein. For example, the API may allow backup servers 118 to send statistics related to backed up data and backup operations to and from clients 108 or traditional backup software. As another example, the API may allow backup servers 118 to receive a request to initiate a backup operation. The API can also allow for backup operations to be scheduled as desired by clients 108 or as controlled by data backup software. Other API functionality is also envisioned.

Figure 2A:
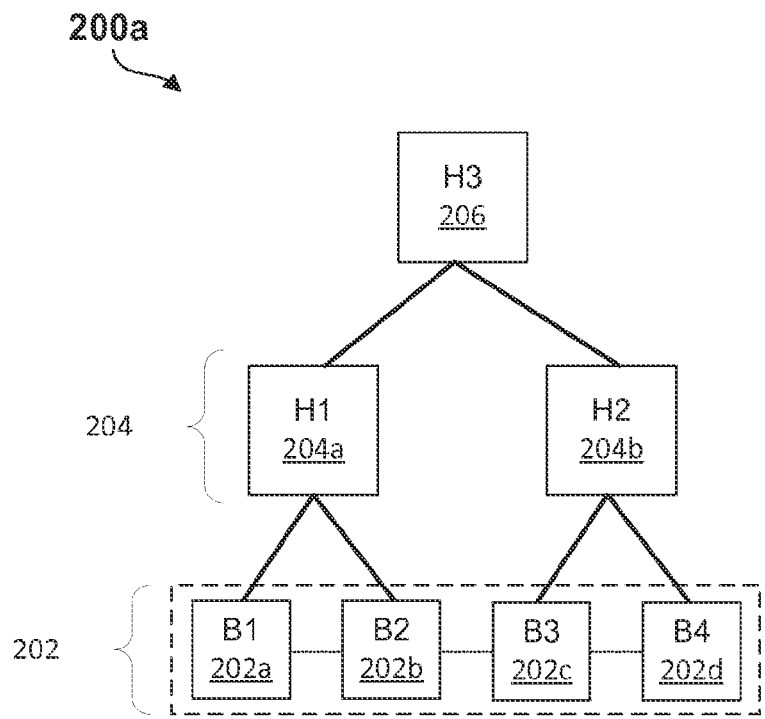
FIG. 2A depicts a hash tree in accordance with an illustrative implementation.

Referring to FIG. 2A, a hash tree 200a is shown in accordance with an illustrative implementation. The hash tree 200a may be a hash tree that is provided by a metadata server 110 to a backup server 118 in an initial or incremental backup operation as discussed above. Although depicted as a binary hash tree, hash tree 200a (and hash trees described herein) may have any number of child nodes/branches. Hash tree 200a represents the data of a particular volume, and can be provided along with additional metadata describing details related to the tree structure. For example, the metadata may include statistics regarding node counts, leaf-node counts, tree-depth, indexes to sub-trees, etc. Backup server 118 may store the additional metadata for future use. Hash tree 200a includes leaves 202a-d, internal nodes 204a-b, and root node 206. Leaves 202a-d store block identifies B1-B4, respectively. In an implementation, leaves 202a-d may be structured as an ordered list that is indexed by its parent nodes, which in this example are internal nodes 204. Block identifiers B1-B4 are identifiers as described herein (e.g., a hash of the corresponding data block's content), and each uniquely identify a particular data block of the volume. Hash tree 200a further includes non-leaf internal nodes 204a-b and non-leaf root node 206. The value stored by each non-leaf node is the hash of that node's children values. For example, hash H1 is the hash of block identifiers B1 and B2, hash H2 is the hash of block identifiers B3 and B4, and hash H3 is the hash of hashes H1 and H2. During an initial backup operation, backup server 118 can walk the tree, or traverse the ordered list of leaves 202a-d to determine that the data blocks corresponding to block identifiers B1-B4 should be retrieved to be backed up. A copy of hash tree 200a (and any accompanying metadata) is stored by backup server 118 when a backup operation is performed.

Figure 2B:
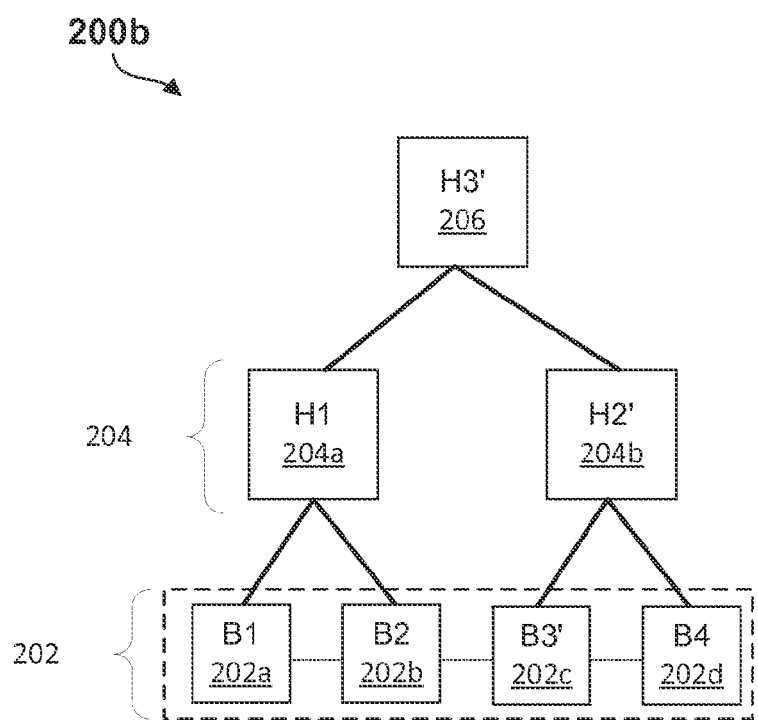
FIG. 2B depicts the hash tree illustrated in FIG. 2A, with updated node hashes, in accordance with an illustrative implementation.

Referring to FIG. 2B, the hash tree 200a of FIG. 2A is shown at a later time instance, as hash tree 200b. For example, hash tree 200a may have been provided by metadata server 110 during an initial backup operation and stored by the backup server 118, and hash tree 200b may have been provided by metadata server 110 during a subsequent incremental backup operation. Both hash trees 200a-b represent the data stored on a particular volume. As depicted, the block identifier B3 of leaf node 202c has changed to become block identifier B3' at some time since the previous backup. For example, new or updated data may have been written to the block referenced by block identifier B3. Because of the structure of the hash tree, the change of block identifier from B3 to B3' causes updates in hashes to propagate upward through the parent node to the root node. Specifically, hash H2 is recalculated to become H2', and hash H3 is recalculated to become to H3'. During a backup operation, backup server 118 may walk the hash tree 200b, and compare the nodes of hash tree 200b to corresponding nodes of hash tree 200a. A difference between corresponding non-leaf node hashes indicates that a block identifier (and therefore block data) below that non-leaf node has changed. If the hashes of corresponding non-leaf nodes are equal, this indicates that the block identifiers below that non-leaf node have not changed (and therefore corresponding block data has also not changed). Thus, the subtree of nodes below an unchanged non-leaf node can be skipped from further processing. In this manner, a performance increase may be realized as the entire hash tree does not need to be traversed in every backup operation. As an example with reference to FIG. 2B, backup server 118 may compare hash tree 200b to hash tree 200a as follows (although analysis performed by backup server 118 is not limited to the following operations or order of operations):

1. Node 206 is analyzed to determine that hash H3' is different from its previous value of H3, and therefore hash trees 200a-b need to be further analyzed.
2. Node 204a is analyzed to determine that hash H1 has not changed, and the subtree of node 204a (leaf nodes 202a-b) may be skipped from further analysis.
3. Node 204b is analyzed to determine that hash H2' is different from its previous value of H2, therefore the subtree of node 204b (leaf nodes 202c-d) must be analyzed.
4. Leaf node 202c is analyzed to determine that block identifier B3' is different from its previous value of B3. Thus, the data block corresponding to block identifier B3' needs to be backed up by backup server 118, since its data as changed since the previous backup operation.
5. Leaf node 202d is analyzed to determine that block identifier B4 has not changed, and traversal of hash trees 200a-b is complete.

After performing the above sample analysis, backup server 118 may proceed to retrieve the data based on the block identifier(s) that indicate data has changed, and has not yet been backed up. In this example, backup server 118 may send a request to a metadata server 110 for the data block identified by block identifier B3'. Upon receipt of the data block, backup server 118 stores the data block as a backup, and stores hash tree 200b (along with any accompanying metadata) for use in future backup and/or restoration operations.

In one implementation using trees, backup server 118 may retrieve the metadata from a metadata server 110 by requesting only child nodes whose parent node has changed. For example, starting with the root, if the root node has changed the children of the root node can then be requested. These nodes can then be compared to corresponding nodes in the previously stored tree to determine if those have changed. Children of any node that has changed can then be retrieved. This process can be repeated until leaf nodes are retrieved. For example, with reference to FIGS. 2A-B, hash tree 200b may be the current metadata from metadata server 110, and hash tree 200a may be stored metadata from a previous backup operation. Backup server 118 may first retrieve root node 206 and analyze it to determine that hash H3' is different from its previous value of H3. In response, backup server 118 may then request nodes 204a-b from interior node level 204. Node 204a is analyzed to determine that hash H1 has not changed, and leaf nodes 202a-b may be skipped from further requests/analysis. Node 204b is analyzed to determine that hash H2' is different from its previous value of H2, and thus backup server 118 may proceed to request appropriate nodes of leaf level 202 (leaves 202c-d). Analysis may then continue as described above to determine that block identifier B3' is different from its previous value of B3 and that the data block corresponding to block identifier B3' needs to be backed up. This implementation may allow for performance increases by minimizing data that is transmitted between backup server 118 and metadata server 110 during the retrieval of metadata.

At some point, it may be desirable by clients 108 or an administrator of system 100 to increase the volume size assigned to a client 108 by adding more data blocks of storage space. In this situation, with backup servers 118 implementations configured to utilize metadata of an ordered list of block identifiers, any newly added block identifiers (corresponding to the new data blocks) may be appended to the end of the ordered list. Thus, during a backup operation, if a backup server 118 receives metadata of an ordered list that has more elements than that of metadata from a prior backup operation, backup server 118 can determine the newly added data blocks that must be backed up based on the additional list elements. The backup operation may proceed as described above with respect to the remaining elements.

Figure 2C:
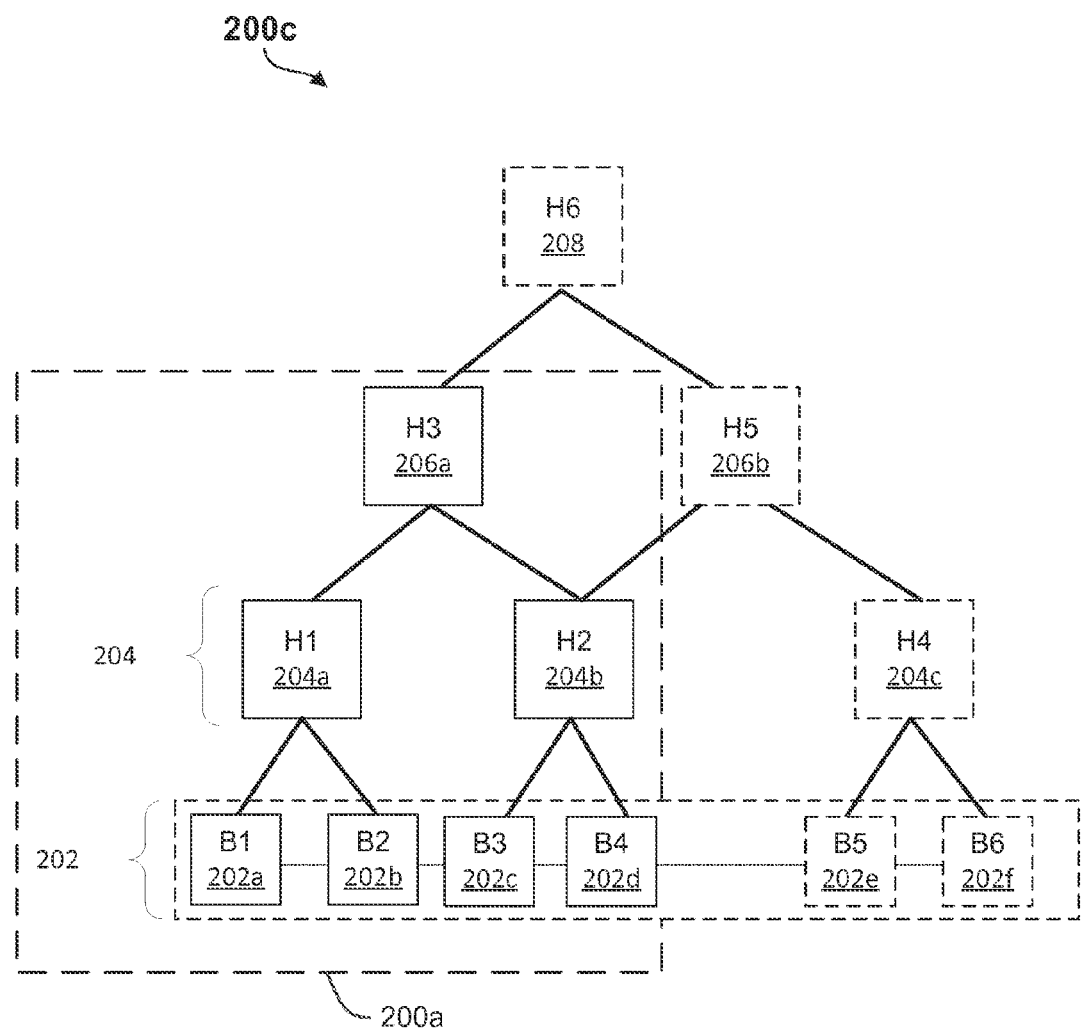
FIG. 2C depicts the hash tree illustrated in FIG. 2A, with newly added leaves, in accordance with an illustrative implementation.

FIG. 2C depicts the result of an increased volume size for implementations configured to utilize metadata of a hash tree. Hash tree 200c is based on hash tree 200a (which is included as a subtree and is denoted by a dashed box). Leaves 202e-f have been newly added to the hash tree and include block identifiers B5-B6, which correspond to the newly added data blocks of the increased volume size. As a result of the volume increase, hash tree 200a is restructured such that root node 206 becomes internal node 206a, and a new root node 208 is created. Further, internal nodes 206b and 204c are added to maintain the tree structure. Hashes H4-H6 are calculated based on the respective child values as described above. After such a restructuring of a hash tree, a backup operation may proceed as described above. However, backup server 118 can determine the newly added data blocks that must be backed up based on a new root node or additional leaves. Also, an implementation may make use of additional metadata that includes the indexes of the root nodes of previously stored trees. In this manner, backup server 118 may access the indexes to locate and compare the root node of a prior tree with the corresponding internal node of the current tree (e.g., root node 206 can be compared to internal node 206a.). If the comparison indicates that the hashes have not changed, then backup server 118 may skip analyzing the subtree of the internal node, and a performance gain may be realized.

At some point, it may be desirable by clients 108 or an administrator of system 100 to reduce the volume size assigned to a client 108 by removing data blocks of storage space. In this situation, with backup server 118 implementations configured to utilize metadata of an ordered list of block identifiers, any removed block identifiers (corresponding to removed data blocks) may be removed from the end of the ordered list. Thus, during a backup operation, if a backup server 118 receives metadata of an ordered list that has fewer elements than that of metadata from a prior backup operation, backup server 118 can determine the backed up data blocks that may be removed based on the additional list elements in the stored list from the prior backup. The backup operation may proceed as described above with respect to the remaining elements. With backup server 118 implementations configured to utilize metadata of a hash tree including leaves that are a list of block identifiers, the backup server 118 may compare the trees (e.g. depth of the trees, leaf node count, etc.) to determine that there has been a change in volume size. In another implementation the size of the volume can be part of the metadata received by the backup servers, and this metadata can be compared to a previously received volume size to determine that a change in volume has occurred. The backup server may then determine the position of the current tree within the stored hash tree. After locating the position of the current root node, the leaf nodes (and corresponding parent nodes) that are not within the subtree of the current root node can be ignored. Once the corresponding root nodes have been determined, the backup operation may then proceed as described above with respect to the remaining nodes.

Figure 3:
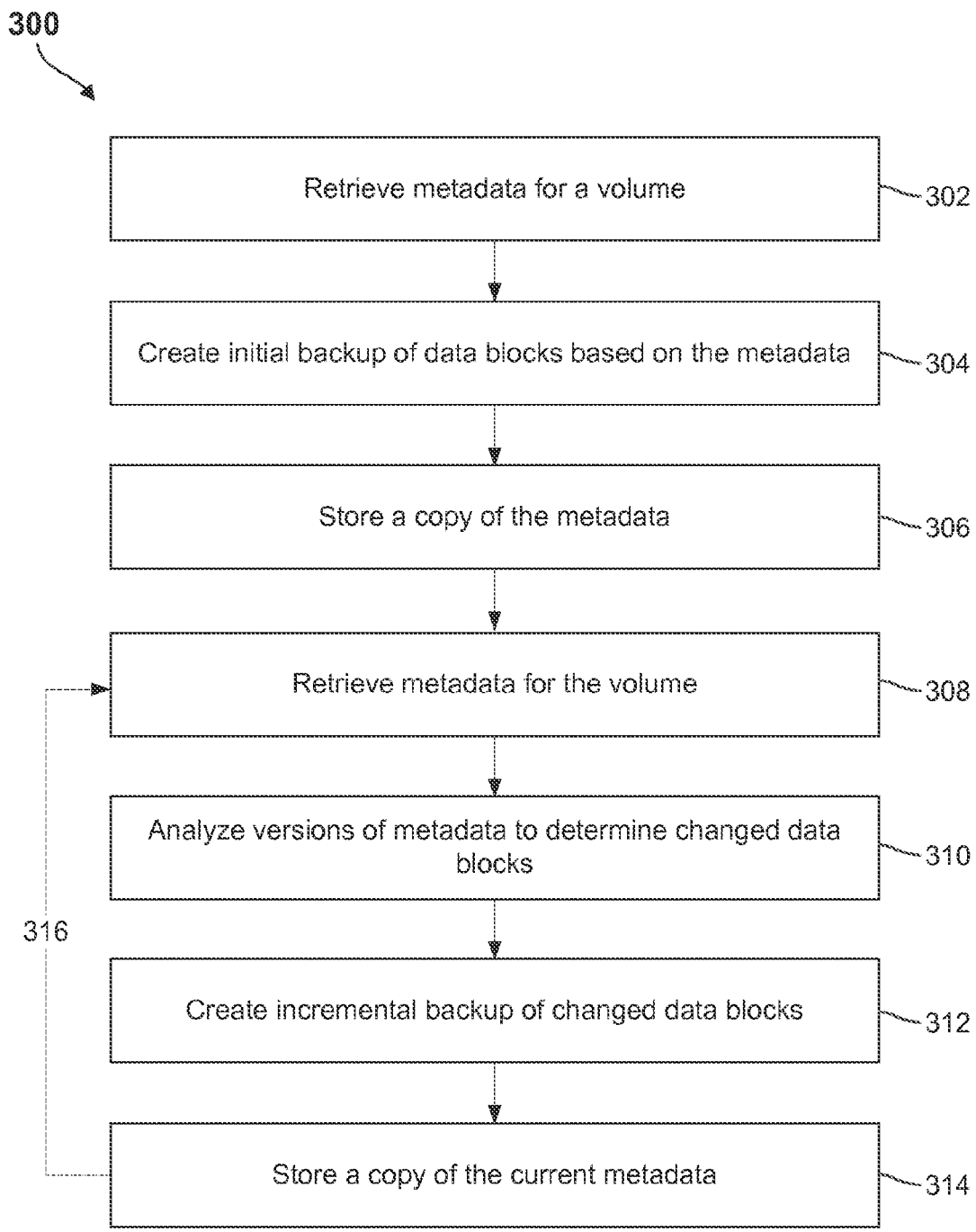
FIG. 3 shows a flow diagram of an incremental block level backup procedure in accordance with an illustrative implementation.

FIG. 3 shows a simplified flow diagram of an incremental block level backup procedure 300, in accordance with an embodiment. Additional, fewer, or different operations of the procedure 300 may be performed, depending on the particular embodiment. The procedure 300 can be implemented on a computing device. In one implementation, the procedure 300 is encoded on a computer-readable medium that contains instructions that, when executed by a computing device, cause the computing device to perform operations of the procedure 300. According to different embodiments, at least a portion of the various types of functions, operations, actions, and/or other features provided by the incremental block level backup procedure may be implemented at one or more nodes and/or volumes of the storage system. In an operation 302, metadata for a particular volume is retrieved (e.g., from a metadata server). For example, a backup sever may initiate a backup operation and retrieve initial metadata as described above. In an alternative embodiment, the backup server may be responding to a request to initiate a backup operation. For example, a client or backup software may submit a request via an API to perform a backup at a certain time. Alternatively, the backup server may be performing a backup according to a schedule (e.g., nightly backups, weekly backups, client-specified backups, etc.). In an operation 304, the initial backup of the data blocks of the volume is created. The metadata provides the block identifiers corresponding to the volume. The metadata may include an ordered list of block identifiers, a hash tree based on block identifiers, and other related data. The block identifiers are used to retrieve the corresponding data blocks to be backed up. For example, the backup server may analyze the metadata in order to request the transmission of and retrieve particular data blocks to be backed up. The request may be sent to the metadata server, which can facilitate the transmission of data from a block server. In an alternative embodiment, the backup server may retrieve the data blocks directly from the block server. The initial backup is a backup of all of the data of the volume as specified by the metadata. In an operation 306, the metadata used for the initial backup is stored for future use. In an operation 308, an incremental backup of the volume is initiated by retrieving the current metadata. For example, sometime after the creation of the initial backup, the backup server may retrieve updated metadata, which has been maintained by the metadata server to be current with the data blocks of the volume. As another example, metadata may be retrieved from a remote storage device. In an operation 310, the current metadata is compared to other metadata (e.g., the metadata from the immediately preceding backup operation, the metadata from the initial backup operation, the metadata from a remote device, etc.). For example, the backup server may analyze the metadata to determine changes in block identifiers as discussed above. Based on any changed block identifiers found during the analysis, in an operation 312, an incremental backup is created. For example, based on the identifiers of the changed data blocks, the backup server may retrieve only the changed data blocks to be backed up. The backup server may store received data blocks as described herein. In an operation 314, the metadata used for the incremental backup is stored for future use. The backup server may also generate additional metadata related to the backup procedure, including statistics to the amount of data backed up, the elapsed time of the backup process, etc. This process may repeat any number of times to create any number of incremental backups, as indicated by operation 316.

In another embodiment, the retrieval of the metadata and the comparison of the metadata to other metadata is performed by a device other than the backup server (e.g., by one or more devices of the storage system). For example, a storage device remote from the backup server may access metadata on the storage device, or may retrieve the metadata from another device, for example, from the metadata server. The storage device may analyze the metadata to determine changes in block identifiers as discussed above. Based on any changed block identifiers found during the analysis, an incremental backup can be created by transferring data to the backup server. For example, based on the identifiers of the changed data blocks, the storage device may transfer only the changed data blocks to the backup server to be backed up. The backup server may store received data blocks as described herein. The metadata used for the incremental backup can be stored by the storage device or can be transferred to another device (e.g., the metadata server) to be stored for future use.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system comprising:
   a backup server comprising one or more processors configured to:
      retrieve an original metadata file from a metadata server, wherein the metadata file comprises an ordered list of block identifiers for data blocks of the volume, wherein each block identifier is used to access a data block stored on a block server, and wherein each block identifier is a hash based on content of its corresponding data block;
      retrieve a copy of all data of the volume based on the original metadata file;
      retrieve a first metadata file, wherein the first metadata file was created separately from the original metadata file;
      compare a block identifier of the first metadata file to a corresponding block identifier of the original metadata file to determine a difference between the first and original block identifiers, wherein the difference indicates that a data block corresponding to the first block identifier has changed;
      retrieve, using the block identifier that identifies a storage location of the changed data block, the changed data block based on the comparison of the first and original block identifiers, wherein the original metadata file comprises an original hash tree, wherein the first metadata file comprises a first hash tree;
   determine a subtree root node of the first hash tree is different than an original root node of the original hash tree;
   add child nodes of the subtree root node to a first data structure;
   for each child node in the data structure:
      determine a corresponding node in the original hash tree;
      determine if the child node is different than the corresponding node;
      determine if the child node is a leaf node or a non-leaf node based on the determination that the child node is different than the corresponding node;
      add the child node to the first data structure based on the determination that the child node is a non-leaf node; and
      add the child node to a second data structure based on the determination that the child node is a leaf node; and
      for each node in the second data structure retrieve a corresponding data block using the block identifier.

2. The system of claim 1, wherein the one or more processors are further configured to:
   determine a size of the volume has increased;
   determine a location of a subtree within the first hash tree that has a subtree root node corresponding to the original root node of the original hash tree;
   determine all leaf nodes of the first hash tree that are not within the subtree;

retrieve data blocks corresponding to all leaf nodes of the first hash tree that are not within the subtree.

3. The system of claim 1, wherein the one or more processors are further configured to:
- retrieve a second metadata file, wherein the second metadata file was created separately from the first metadata file;
- compare a block identifier of the second metadata file to a corresponding block identifier of the first metadata file to determine a difference between the second and first block identifiers, wherein the difference between the second and first block identifiers indicates that a data block corresponding to the second block identifier has changed; and
- retrieve the changed data block corresponding to the second block identifier based on the comparison of the second and first block identifiers.

4. The system of claim 1, wherein the data of the volume is compressed data.

5. The system of claim 1, wherein the one or more processors are further configured to create the initial backup or the incremental backup in response to a request received via an application programming interface (API) of the backup server.

6. The system of claim 1, wherein data is retrieved by the one or more processors of the backup server according a protocol of at least one of small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), and a custom protocol.

7. A method comprising:
creating an initial backup of a volume at a backup server, wherein creating the initial backup comprises:
- retrieving an original metadata file from a metadata server, wherein the metadata file comprises an ordered list of block identifiers for data blocks of the volume, wherein each block identifier is used to access a data block stored on a block server, and wherein each block identifier is a hash based on content of its corresponding data block; and
- retrieving a copy of all data of the volume based on the original metadata file; and
creating a first incremental backup of the volume at the backup server, wherein creating the first incremental backup comprises:
- retrieving a first metadata file, wherein the first metadata file was created separately from the original metadata file;
- comparing a block identifier of the first metadata file to a corresponding block identifier of the original metadata file to determine a difference between the first and original block identifiers, wherein the difference indicates that a data block corresponding to the first block identifier has changed; and
- retrieving, using the block identifier that identifies a storage location of the changed data block, the changed data block based on the comparison of the first and original block identifiers, wherein the original metadata file comprises an original hash tree, wherein the first metadata file comprises a first hash tree;
- determining a subtree root node of the first hash tree is different than an original root node of the original hash tree;
- adding child nodes of the subtree root node to a first data structure;
- for each child node in the data structure:
  - determining a corresponding node in the original hash tree;
  - determining if the child node is different than the corresponding node;
  - determining if the child node is a leaf node or a non-leaf node based on the determination that the child node is different than the corresponding node;
  - adding the child node to the first data structure based on the determination that the child node is a non-leaf node; and
  - adding the child node to a second data structure based on the determination that the child node is a leaf node; and
- for each node in the second data structure retrieving a corresponding data block using the block identifier.

8. The method of claim 7, further comprising:
determining a size of the volume has increased;
determining a location of a subtree within the first hash tree that has a subtree root node corresponding to the original root node of the original hash tree;
determining all leaf nodes of the first hash tree that are not within the subtree;
retrieving data blocks corresponding to all leaf nodes of the first hash tree that are not within the subtree.

9. The method of claim 7, further comprising creating a second incremental backup of the volume, wherein creating the second incremental backup comprises:
- retrieving a second metadata file, wherein the second metadata file was created separately from the first metadata file;
- comparing a block identifier of the second metadata file to a corresponding block identifier of the first metadata file to determine a difference between the second and first block identifiers, wherein the difference between the second and first block identifiers indicates that a data block corresponding to the second block identifier has changed; and
- retrieving the changed data block corresponding to the second block identifier based on the comparison of the second and first block identifiers.

10. The method of claim 7, wherein the data of the volume is compressed data.

11. The method of claim 7, wherein the initial backup or the incremental backup are created in response to a request received via an application programming interface (API) of the backup server.

12. The method of claim 7, wherein data is retrieved according a protocol of at least one of small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), and a custom protocol.

13. A non-transitory computer-readable medium having instructions stored thereon, that when executed by a computing device cause the computing device to perform operations comprising:
creating an initial backup of a volume at a backup server, wherein creating the initial backup comprises:
- retrieving an original metadata file from a metadata server, wherein the metadata file comprises an ordered list of block identifiers for data blocks of the volume, wherein each block identifier is used to access a data block stored on a block server, and wherein each block identifier is a hash based on content of its corresponding data block; and retrieving a copy of all data of the volume based on the original metadata file; and creating a first incremental backup of the volume at the backup server, wherein creating the first incremental backup comprises:

retrieving a first metadata file, wherein the first metadata file was created separately from the original metadata file;

comparing a block identifier of the first metadata file to a corresponding block identifier of the original metadata file to determine a difference between the first and original block identifiers, wherein the difference indicates that a data block corresponding to the first block identifier has changed; and retrieving, using the block identifier that identifies a storage location of the changed data block, the changed data block based on the comparison of the first and original block identifiers, wherein the original metadata file comprises an original hash tree, wherein the first metadata file comprises a first hash tree;

determining a subtree root node of the first hash tree is different than an original root node of the original hash tree;

adding child nodes of the subtree root node to a first data structure;

for each child node in the data structure:
determining a corresponding node in the original hash tree;
determining if the child node is different than the corresponding node;
determining if the child node is a leaf node or a non-leaf node based on the determination that the child node is different than the corresponding node;
adding the child node to the first data structure based on the determination that the child node is a non-leaf node; and adding the child node to a second data structure based on the determination that the child node is a leaf node; and for each node in the second data structure retrieving a corresponding data block using the block identifier.

14. The non-transitory computer-readable medium of claim 13, wherein the operations further comprise:
determining a size of the volume has increased;
determining a location of a subtree within the first hash tree that has a subtree root node corresponding to the original root node of the original hash tree;
determining all leaf nodes of the first hash tree that are not within the subtree;
retrieving data blocks corresponding to all leaf nodes of the first hash tree that are not within the subtree.

15. The non-transitory computer-readable medium of claim 13, wherein the operations further comprise creating a second incremental backup of the volume, wherein creating the second incremental backup comprises:
retrieving a second metadata file, wherein the second metadata file was created separately from the first metadata file;
comparing a block identifier of the second metadata file to a corresponding block identifier of the first metadata file to determine a difference between the second and first block identifiers, wherein the difference between the second and first block identifiers indicates that a data block corresponding to the second block identifier has changed; and
retrieving the changed data block corresponding to the second block identifier based on the comparison of the second and first block identifiers.

16. The non-transitory computer-readable medium of claim 13, wherein the data of the volume is compressed data.

17. The non-transitory computer-readable medium of claim 13, wherein the initial backup or the incremental backup are created in response to a request received via an application programming interface (API) of the backup server.

* * * * *